Patented Nov. 24, 1931

1,833,087

UNITED STATES PATENT OFFICE

LOUIS ERNEST MIGEOT, OF SAINT-MICHEL-SOUGLAND, FRANCE

ENAMEL CONTAINING BARIUM AND STRONTIUM COMPOUNDS AND FOR THE ENAMELLING OF METALS

No Drawing. Application filed May 27, 1927, Serial No. 194,862, and in France June 26, 1926.

The enamels in current use for the enamelling of metals by the known methods employed in this industry, i. e. by the application of the enamel by sprinkling, rolling, dipping, or in liquid form are essentially based upon lead compounds such as litharge, minium, massicot, lead carbonate, or zinc compounds, such as have been employed for a long period in French and foreign enamel works.

The present invention relates to opaque enamels both white and coloured, and chiefly to transparent enamels of all colours so-called ceramic enamels upon cast and sheet iron and like other metals and it possesses a great advantage from the fact that it eliminates the pernicious effects of lead poisoning in the enamel works, as well as the devitrification of the so-called ceramic enamels containing a large amount of zinc compounds, this taking place either during the enamelling process at a rather high heat, or during the use of heating devices coated with such enamels.

The enamels free from lead which are manufactured according to the method hereinafter specified, are most advantageous from the fact that even after a long period they are not subject to the changes inherent in the known enamels under the action of the atmosphere.

The different methods of enamelling are too well known to require any detailed description. The use of the enamels in accordance with the invention will offer no changes in such methods. With reference for example to cast iron according to the process in which the enamel is applied as powder, the substance is directly sprinkled upon the object which is sufficiently clean and is heated to the proper redness. In the case of transparent enamelling on what is termed the ceramic process, a layer of white enamel must first be put on in order to form the background, and this is at once followed by a second sprinkling with transparent colored enamel without placing the object again in the muffle.

The present invention essentially consists in the use of elements such as barium and strontium in quantities which vary according to the composition in use, in all their natural or artificial compounds or derivatives; by the use of barium or strontium I am chiefly enabled to obtain fluxes of a stable character, i. e. such as will preserve a perfect transparency during the different furnace heating operations required in the manufacture.

For the preparation of such enamels, either transparent or opaque, and optionally coloured, I may employ the following substances which are in current use:

Boric anhydride; which is furnished by borate of soda, optionally crystallized, or pandermite, borocalcite, boric acid or the like.

Sodium or potassium; in the form of carbonate, nitrates or chlorides.

Calcium; in the form of sulphate, carbonate, phosphate and the like, this constituent is moreover not necessary.

Silica; in the form of quartz, sands, silica of sea pebbles either natural or baked.

Fluorine; in its natural or artificial compounds.

Alumina; represented by natural minerals.

Zinc; in the form of its usual compounds.

To such substances I usually add, according to the invention, barium and eventually strontium in all their forms and natural or artificial derivatives such as carbonates, sulphates, chlorides, nitrates, phosphates, and the like. In these various compositions, I prefer to employ the silica in the form of feldspar and to directly add, as a surplus, alumina either hydrated or calcined.

All these substances, which are accurately proportioned and are intimately mixed, are then melted and cast in the dry or moist state, and are then ground up in the dry or moist state, according to the use which is to be made of the enamel.

The composition of the mixtures may obviously vary according to a great number of formulæ and within very wide limits, and I may mention the following:

|  | Per cent |
|---|---|
| Boric anhydride | 5 to 30 |
| Barium | 5 to 75 |
| Strontium | 5 to 75 |
| Alkalies | 5 to 20 |
| Silica | 5 to 40 |
| Zinc | 0 to 20 |
| Lime | 1 to 50 |
| Alumina | 0,5 to 16 |
| Fluorine | 0,5 to 14 |

The compositions are coloured before or after they are melted, according to the nature of the product to be obtained, by adding the known colouring oxides such as the oxides of iron, manganese, copper, zinc, cadmium, uranium or the like.

To obtain opaque enamels with these different compositions, it is necessary to employ natural phosphate or sulphate of lime, or calcined bone phosphate, Vienna lime, phosphate of baryta, oxide of antimony of the maximum purity in order to avoid prejudicial salts, oxide of tin, fluorspar, cryolite and other bodies.

The following is an example of a white opaque enamel which has a remarkable solidity and adhesion, which may be employed directly upon cast iron, sheet iron, copper or the like, either alone and in powdered form for sanitary articles, washstands, sinks, bathtubs and the like, or in liquid form, or as a first layer and a backing for a transparent coloured enamel:

|  | Per cent |
| --- | --- |
| Borax | 9.30 |
| Feldspar | 16.90 |
| Carbonate of lime | 8.86 |
| Baryta | 24.60 |
| Boric acid | 5.65 |
| Zinc | 3.65 |
| Alkalies | 6.43 |
| Antimony | 7.52 |
| Fluorspar | 5.30 |
| Phosphate of lime | 9.53 |
| Cryolite | 1.13 |
| Alumina | 1.13 |
|  | 100.00 |

This white opaque enamel may be used as a base for all opaque coloured enamels by adding the known colouring oxides.

The following is a formula for a transparent enamel of the ceramic type:

|  | Per cent |
| --- | --- |
| Borax | 21 |
| Boric acid | 11.25 |
| Baryta | 25 |
| Feldspar | 8.75 |
| Alkalies | 11 |
| Lime | 11.5 |
| Zinc | 10 |
| Alumina | 1.5 |
|  | 100.00 |

This base and the bases of similar composition are coloured by adding suitable colouring substances, either before or after they are melted.

When applied upon a first layer of opaque white, this enamel can be favourably compared with the products in current use as concerns solidity, adhesion, brilliancy and other qualities. It can especially be subjected to a second or third heating in the muffle without any change in its nature.

When the various enamels are to be applied upon sheet iron, I simply add to the enamels themselves the usual substances which will hold them in suspension in the liquid, such as pipe clay, kaolin, magnesia and the like.

Having thus described my process, what I claim as new therein, and my own invention, is:

A composition for enamelling metals by sprinkling upon a first coating of opaque white enamel, the use of a transparent or translucent enamel free from lead, essentially consisting in a mixture of borax 21%, boric acid 11.25%, baryta 25%, feldspar 8.75%, alkalies 11%, lime 11.5%, zinc 10%, alumina 1.5%.

In testimony whereof I have hereunto affixed my signature.

LOUIS ERNEST MIGEOT.